United States Patent
Fodor et al.

(10) Patent No.: US 10,980,039 B2
(45) Date of Patent: Apr. 13, 2021

(54) COORDINATION OF SCHEDULED AND CONTENTION-BASED UPLINK TRANSMISSIONS

(71) Applicant: Telefonaktiebolaget LM Ericsson (publ), Stockholm (SE)

(72) Inventors: Gabor Fodor, Hässelby (SE); Muhammad Kazmi, Sundbyberg (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

(21) Appl. No.: 16/336,577

(22) PCT Filed: Sep. 29, 2016

(86) PCT No.: PCT/EP2016/073303
§ 371 (c)(1),
(2) Date: Mar. 26, 2019

(87) PCT Pub. No.: WO2018/059698
PCT Pub. Date: Apr. 5, 2018

(65) Prior Publication Data
US 2019/0261387 A1    Aug. 22, 2019

(51) Int. Cl.
*H04W 72/12* (2009.01)
*H04W 16/14* (2009.01)
(Continued)

(52) U.S. Cl.
CPC ...... *H04W 72/1215* (2013.01); *H04W 16/14* (2013.01); *H04W 72/1268* (2013.01);
(Continued)

(58) Field of Classification Search
None
See application file for complete search history.

(56) References Cited

U.S. PATENT DOCUMENTS 9,094,917 B2    7/2015 Charbit et al.
2014/0003387 A1*  1/2014 Lee .................. H04L 5/001
                                              370/330
(Continued)

FOREIGN PATENT DOCUMENTS

GB    201201791    3/2012
GB    2498988 A    8/2013
WO    2015141584 A1    9/2015

OTHER PUBLICATIONS

3rd Generation Partnership Project, "3rd Generation Partnership Project; Technical Specification Group Radio Access Network; Study on Licensed-Assisted Access to Unlicensed Spectrum; (Release 13)", 3GPP TR 36.889 V13.0.0, Jun. 1, 2015, pp. 1-88, 3GPP, France.
(Continued)

*Primary Examiner* — Brian S Roberts
(74) *Attorney, Agent, or Firm* — Patent Portfolio Builders, PLLC

(57) ABSTRACT

A radio device performs uplink transmissions on a first carrier. The uplink transmissions on the first carrier require scheduling by a node of a wireless communication network. Further, the radio device performs uplink transmissions on a second carrier. The uplink transmissions on the second carrier require that, by a carrier sense operation, the radio device assesses the second carrier as being unoccupied before proceeding to the uplink transmission on the second carrier. For a certain uplink transmission on the second carrier, the radio device performs the carrier sense operation to assess whether the second carrier is unoccupied and provides an indication of a result of the carrier sense operation to the node which is responsible for the scheduling.

18 Claims, 7 Drawing Sheets

(51) Int. Cl.
*H04W 74/00* (2009.01)
*H04W 74/02* (2009.01)
*H04W 74/08* (2009.01)

(52) U.S. Cl.
CPC ......... *H04W 74/004* (2013.01); *H04W 74/02* (2013.01); *H04W 72/1278* (2013.01); *H04W 74/0808* (2013.01)

(56) References Cited

U.S. PATENT DOCUMENTS

2016/0233989 A1* 8/2016 Belghoul ............ H04W 72/042
2017/0118728 A1* 4/2017 Harada ................ H04W 52/38
2017/0310434 A1* 10/2017 Harada ................ H04B 17/318

OTHER PUBLICATIONS

Blackberry UK Ltd, "Scheduling aspects of eLAA", 3GPP TSG RAN2 WG Meeting #95, Gothenburg, Sweden, Aug. 22, 2016, pp. 1-2, R2-165573, 3GPP.

Qualcomm Incorporated, "Remaining details of UL LBT", 3GPP TSG RAN WG1 #86, Gothenburg, Sweden, Aug. 22, 2016, pp. 1-8, R1-166255, 3GPP.

* cited by examiner

COORDINATION OF SCHEDULED AND CONTENTION-BASED UPLINK TRANSMISSIONS

CROSS-REFERENCE TO RELATED APPLICATION

This application is a U.S. National Stage Filing under 35 U.S.C. § 371 of International Application No. PCT/EP2016/073303, filed on Sep. 29, 2016, the disclosure of which is fully incorporated herein by reference.

TECHNICAL FIELD

The present invention relates to methods for controlling radio transmissions and to corresponding devices and systems.

BACKGROUND

In wireless communication technologies, utilization of certain carrier frequencies, in the following also referred to as "carrier" may require that a radio device first senses whether the carrier is occupied before proceeding to a transmission on the carrier. This operation is also referred to as a Listen Before Talk (LBT) procedure. The operation of sensing whether the carrier is occupied is also referred to as carrier sense operation. An LBT procedure may for example be required before transmitting on a carrier from an unlicensed frequency spectrum, e.g., a frequency range which is not exclusively assigned to one wireless communication network, but shared by multiple wireless communication networks or multiple radio technologies. The LBT procedure allows for avoiding colliding usage of the carrier with other radio devices or even other radio technologies can be avoided. For example, an unlicensed spectrum, e.g., a range between 5150 MHz and 5925 MHz can be simultaneously used by multiple different radio technologies, such as the LTE technology specified by 3GPP ($3^{rd}$ Generation Partnership Project) and a WLAN (Wireless Local Area Network) technology as specified by the IEEE 802.11 standards family.

The LTE technology may use the unlicensed spectrum on the basis of a concept referred to as licensed-assisted access (LAA) and discussed in 3GPP TR 36.889 V13.0.0 (2015-06). In the case of LAA, a carrier from a licensed spectrum is used for controlling or assisting radio transmissions on a carrier from an unlicensed spectrum. Radio transmissions on the carrier from the licensed spectrum are scheduled by an access node of the LTE radio access network, referred to as eNB. This scheduling involves that the eNB allocates radio resources for the radio transmission to the UE and indicates the allocated radio resources to the UE. The radio transmissions on the carrier from the unlicensed spectrum require may also be unscheduled, which means that there is typically no explicit control from the LTE radio access network when a UE (user equipment) will transmit on the carrier from the unlicensed spectrum. In any case, the timing of the transmission on the carrier from the unlicensed spectrum will depend on the LBT procedure performed by the UE before it can transmit on the carrier from the unlicensed spectrum.

However, when a UE uses both a first carrier which requires scheduling of radio transmissions and a second carrier which requires that the UE performs an LBT procedure before it can transmit on the carrier, like for example in the LAA concept, some constraints may prevent the UE from fully benefitting from the aggregated capacity offered by both carriers. For example, the UE might be power limited and not have sufficient power to simultaneously transmit on both carriers. Further, the UE's capabilities might be limited in such a way that the UE cannot transmit simultaneously on both carriers. Further, the UE's capabilities might be limited in such a way that simultaneous transmission on both carriers is possible only with reduced performance for at least one of the carriers, e.g., with reduced data rate.

The above constraints may have the effect that when the UE successfully performs the LBT procedure, i.e., finds that the second carrier is unoccupied, and starts a radio transmission on the second carrier, it cannot perform a scheduled radio transmission on the first carrier or only perform a radio transmission with reduced performance on the first carrier, which means that radio resources of the first carrier would be used inefficiently. When after the successful LBT procedure the UE rather decides to perform the scheduled transmission on the first carrier and refrains from starting a radio transmission on the second carrier, the UE may need to repeat the LBT procedure before it can transmit on the second carrier. However, this repeated LBT procedure may then be unsuccessful, i.e., the UE may then find that the second carrier is occupied. Accordingly, the UE's chances to benefit from usage of the second carrier may then be reduced.

Accordingly, there is a need for techniques which allow for efficient control of radio transmissions in a wireless communication network in scenarios where a radio device uses a multi-carrier configuration which includes a carrier requiring scheduling of radio transmissions by the wireless communication network and a carrier requiring that the radio device performs an LBT procedure before transmitting on the carrier.

SUMMARY

According to an embodiment of the invention, a method of controlling uplink (UL) transmissions from a radio device to a wireless communication network is provided. According to the method, the radio device performs UL transmissions on a first carrier, the UL transmissions on the first carrier require scheduling by a node of the wireless communication network. Further, the radio device performs UL transmissions on a second carrier. The UL transmissions on the second carrier require that, by a carrier sense operation, the radio device assesses the second carrier as being unoccupied before proceeding to the UL transmission on the second carrier. According to the method, the radio device performs the carrier sense operation to assess whether the second carrier is unoccupied and provides an indication of a result of the carrier sense operation to the node.

According to a further embodiment of the invention, a method of controlling UL transmissions from a radio device to a wireless communication network is provided. According to the method, a node of the wireless communication network schedules UL transmissions of the radio device on a first carrier. Further, the node of the wireless communication network determining availability of the second carrier for UL transmissions of the radio device on a second carrier. The UL transmissions on the second carrier require that, by a carrier sense operation, the radio device assesses the second carrier as being unoccupied before proceeding to the UL transmission on the second carrier. Depending on the determined availability of the second carrier, the node of the wireless communication network controls the scheduling of one or more of the UL transmissions on the first carrier.

According to a further embodiment of the invention, a radio device is provided. The radio device is configured to perform UL transmissions on a first carrier. The UL transmissions on the first carrier require scheduling by a node of the wireless communication network. Further, the radio device is configured to perform UL transmissions on a second carrier. The UL transmissions on the second carrier require that, by a carrier sense operation, the radio device assesses the second carrier as being unoccupied before proceeding to the UL transmission on the second carrier. Further, the radio device is configured to perform the carrier sense operation to assess whether the second carrier is unoccupied and provide an indication of a result of the carrier sense operation to the node.

According to a further embodiment of the invention, a node for a wireless communication network is provided. The node is configured to schedule UL transmissions of the radio device on a first carrier. Further, the node is configured to determine availability of a second carrier for UL transmissions of the radio device on the second carrier. The UL transmissions on the second carrier require that, by a carrier sense operation, the radio device assesses the second carrier as being unoccupied before proceeding to the UL transmission on the second carrier. Further, the node is configured to control the scheduling of one or more of the uplink transmissions on the first carrier depending on the determined availability of the second carrier.

According to a further embodiment of the invention, a system is provided. The system comprises a radio device and a node of a wireless communication network. The node is configured to schedule UL transmissions of the radio device on a first carrier. Further, the node is configured to determine availability of the second carrier for UL transmissions of the radio device on a second carrier. The UL transmissions on the second carrier require that, by a carrier sense operation, the radio device assesses the second carrier as being unoccupied before proceeding to the UL transmission on the second carrier. Further, the node is configured to control the scheduling of one or more of the UL transmissions on the first carrier depending on the determined availability of the second carrier. The radio device is configured to perform the UL transmissions on the first carrier in accordance with the scheduling by the node. Further, the radio device is configured to perform the carrier sense operation to assess whether the second carrier is unoccupied. Further, the radio device may be configured to indicate the result of the carrier operation to the node. The node may then determine the availability of the second carrier depending on the indicated result of the carrier sense operation.

According to a further embodiment of the invention, a computer program or computer program product is provided, e.g., in the form of a non-transitory storage medium, which comprises program code to be executed by at least one processor of a radio device. Execution of the program code causes the radio device to perform UL transmissions on a first carrier. The UL transmissions on the first carrier require scheduling by a node of the wireless communication network. Further, execution of the program code causes the radio device to perform UL transmissions on a second carrier. The UL transmissions on the second carrier require that, by a carrier sense operation, the radio device assesses the second carrier as being unoccupied before proceeding to the UL transmission on the second carrier. Further, execution of the program code causes the radio device to perform the carrier sense operation to assess whether the second carrier is unoccupied and provide an indication of a result of the carrier sense operation to the node.

According to a further embodiment of the invention, a computer program or computer program product is provided, e.g., in the form of a non-transitory storage medium, which comprises program code to be executed by at least one processor of a node of a wireless communication network. Execution of the program code causes the node to schedule UL transmissions of the radio device on a first carrier. Further, execution of the program code causes the node to determine availability of a second carrier for UL transmissions of the radio device on the second carrier. The UL transmissions on the second carrier require that, by a carrier sense operation, the radio device assesses the second carrier as being unoccupied before proceeding to the UL transmission on the second carrier. Further, execution of the program code causes the node to control the scheduling of one or more of the uplink transmissions on the first carrier depending on the determined availability of the second carrier.

Details of such embodiments and further embodiments will be apparent from the following detailed description of embodiments.

DETAILED DESCRIPTION OF EMBODIMENTS

Figure 1:
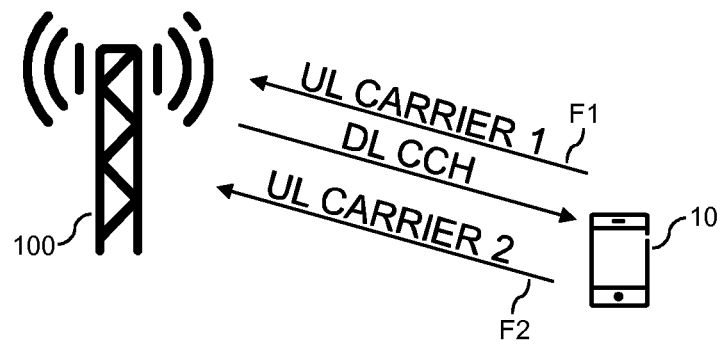
FIG. 1 schematically illustrates a scenario in which radio transmissions are controlled according to an embodiment of the invention.

In the following, concepts in accordance with exemplary embodiments of the invention will be explained in more detail and with reference to the accompanying drawings. The illustrated embodiments relate to control of radio transmissions in a wireless communication network. The wireless communication network is assumed to be based on a radio technology in which a radio device may simultaneously use multiple carriers, e.g., by carrier aggregation. For one or more first carriers UL transmissions require scheduling by a node of the wireless communication network. This node may be an access node, such as a base station, an access point, a wireless access point, an eNB ("evolved Node B"), a relay node, a base transceiver station, a transmission point, a transmission nodes, a remote radio unit, a remote radio head, a node of a distributed antenna system, a radio network controller, a base station controller, or the like. For one or more second carriers UL transmissions require that, by a carrier sense operation, the radio device performs a carrier sense procedure to assess the carrier as being unoccupied before proceeding to the UL transmission on the second carrier. The UL transmission(s) on the second carrier(s) may for example be based on an LBT procedure.

As used herein, an LBT procedure may correspond to any type of procedure or mechanism in which the radio device needs to assess a carrier as being unoccupied before the radio device can proceed to transmit signals on that carrier. This may also be referred to as CSMA (Carrier Sense Multiple Access). The carrier sense operation may also be referred to as clear channel assessment (CCA), clear channel determination, or the like. The UL transmissions which require that the carrier is first assessed as being unoccupied may also be referred to as contention-based UL transmissions.

The radio technology may for example based on using the LTE radio technology as specified by 3GPP in an unlicensed frequency spectrum, e.g., using the concept of licensed-assisted access (LAA) as discussed in 3GPP TR 36.889 V13.0.0 (2015-06). When using the LTE radio technology, the node which is responsible for the scheduling on the first UL carriers may be an eNB. However, it is noted that the illustrated concepts may also be applied to other technologies, e.g., a next generation wireless communication technology, or a WLAN (Wireless Local Area Network) technology.

The illustrated concepts aim at efficiently coordinating the UL transmissions on the first carrier(s) and the UL transmissions on the second carrier(s), in particular at coordinating the scheduling of UL transmissions on the first carrier(s) and the carrier sense operation(s) on the second carrier(s). This may be accomplished by the radio device informing the node responsible for the scheduling about a result of the carrier sense operation performed in connection with an UL transmission on the second carrier(s). Further, this may be accomplished by the node responsible for the scheduling determining availability of the second carrier(s) for UL transmissions of the radio device on the second carrier(s). The latter determination may be performed on the basis of the indicated result of the carrier sense operation as provided by the radio device. However, the determination may alternatively or in addition also be based on other kinds of input, e.g., based on signals as received by the node on the second carrier(s) and/or based on information from one or more other nodes of the wireless communication network.

FIG. 1 schematically illustrates a scenario in which the illustrated concepts may be utilized. Specifically, FIG. 1 illustrates a scenario in which a radio device 10 sends UL transmissions on a first UL carrier F1 (UL CARRIER 1) and on a second UL carrier F2 (UL CARRIER 2) to an access node 100 of the wireless communication network. The radio device 10 may be a UE, e.g., a mobile phone, smartphone, tablet computer, a laptop computer, a personal digital assistant (PDA), or other type of wireless communication device. The radio device 10 may also be a UE supporting device-to-device (D2D) communication, a wireless modem, or a machine type communication (MTC) device or machine-to-machine (M2M) device. Further, the radio device 10 may be a module or component for enabling radio connectivity of some other device, such as a laptop embedded equipment (LEE), laptop mounted equipment (LME), a USB (Universal Serial Bus) dongle, or the like. However, it is noted that the illustrated concepts could also be applied to other kinds of radio devices, such as relay nodes.

The first UL carrier F1 and the second UL carrier F2 may be from different frequency spectra. For example, the first UL carrier F1 may be from a licensed frequency spectrum, which is exclusively assigned to an operator of the wireless communication network, and the second UL carrier F2 may be from an unlicensed frequency spectrum, e.g., a frequency spectrum which is shared with one or more other operators and/or one or more other radio technologies.

In the illustrated scenario, the UL transmissions on the first UL carrier F1 require scheduling by a node of the wireless communication network. In the illustrated example, the access node 100 is assumed to be responsible for performing this scheduling. The scheduling is assumed to involve allocating radio resources of the first UL carrier F1 to the radio device 10 and indicating the allocated radio resources to the radio device 10, e.g., by sending an UL scheduling grant on a downlink control channel (DL CCH) to the radio device 10.

The UL transmissions on the second UL carrier F2 require that before proceeding to a UL transmission on the second UL carrier F2, the radio device 10 performs a channel sense operation to assess the second UL carrier F2 as being unoccupied. One result of the channel sense operation may be that the second UL carrier F2 is assessed as being unoccupied. In this case, the radio device 10 may proceed to perform the UL transmission on the second UL carrier F2. Another result of the channel sense operation may be that the second UL carrier F2 is assessed as being occupied. For example, the radio device 10 detect an ongoing radio transmission on the second UL carrier F2. In order to avoid a conflict between the ongoing radio transmission and the UL transmission, the radio device 10 may then defer the UL transmission on the second UL carrier F2. For example, after expiry of a backoff time the radio device 10 could repeat the carrier sense operation to assess whether the second UL carrier F2 is now unoccupied. The radio device 10 may repeat deferring of the UL transmission and repeating of the carrier sense operation until the second UL carrier F2 is found to be unoccupied or a maximum number of repetitions is reached. The backoff time may vary from repetition to repetition. For example, the backoff time may increase from one repetition to the next repetition.

Figure 2:
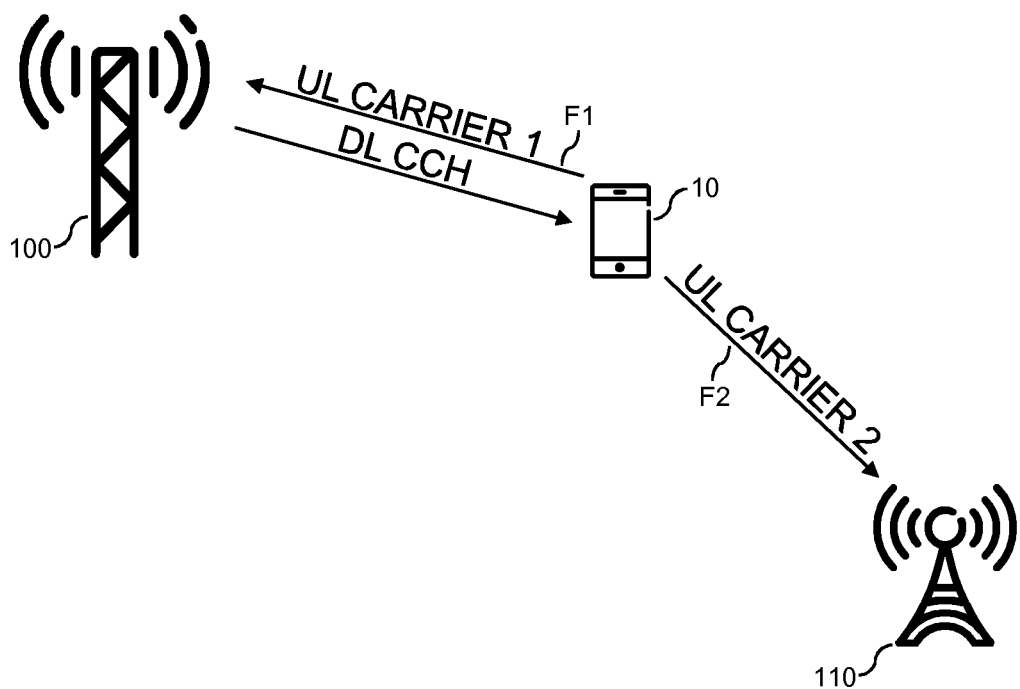
FIG. 2 schematically illustrates a further scenario in which radio transmissions are controlled according to an embodiment of the invention.

FIG. 2 schematically illustrates a further scenario in which the illustrated concepts may be utilized. The scenario of FIG. 2 is similar to that of FIG. 1. However, in the scenario of FIG. 2 a further access node 110 is responsible for receiving the UL transmissions on the second UL carrier F2. The further access node 110 may for example be a low power node, such as a pico base station.

It is noted that in some scenarios also the UL transmissions on the second UL carrier may require scheduling. In the scenario of FIG. 1, this scheduling may be performed by the access node 100. In the scenario of FIG. 1, this scheduling may be performed by the further access node 110.

In the scenario of FIG. 1 or 2, there may be constraints which prevent the radio device 10 from fully benefitting from the aggregated capacity offered by the first UL carrier and the second UL carrier. For example, the radio device 10 might be power limited and not have sufficient power to simultaneously transmit on both UL carriers F1, F2. This type of constraint will in the following be referred to as C1. Further, the capabilities of the radio device 10 might be limited in such a way that the radio device 10 cannot transmit simultaneously on both UL carriers F1, F2. This type of constraint will in the following be referred to as C2.

Further, the capabilities of the radio device 10 might be limited in such a way that simultaneous transmission on both UL carriers F1, F2 is possible only with reduced performance for at least one of the UL carriers F1, F2, e.g., with reduced data rate. This type of constraint will in the following be referred to as C3.

In order to coordinate the scheduling of the UL transmissions on the first UL carrier F1 with the carrier sense operation or LBT procedure required for the UL transmissions on the second UL carrier F2, corresponding procedures may be implemented at the radio device 10 and/or at the access node 100. In the scenario of FIG. 2, such procedures may also be implemented at the further access node 110.

These procedures may involve that the access node 100 maintains a state of the radio device 10 regarding its eligibility for scheduling of UL transmissions on the first UL carrier F1. This eligibility may depend on the carrier sense operation on the second UL carrier F2, e.g., a result of the carrier sense operation or on an imminent start of the carrier sense operation. In this way, the scheduling process may take into account the possibility that the carrier sense operation may result in the radio device 10 gaining access to the second UL carrier F2 and performing an UL transmission on the second UL carrier F2. Depending on the above-mentioned constraints, the scheduling may be adapted in various ways.

For example, if the result of the carrier sense operation is found to be that the second UL carrier F2 is occupied, the access node 100 may schedule the radio device 10 for one or more UL transmissions on the first UL carrier F1. The scheduling of UL transmissions on the first UL carrier F1 may continue for a certain time period, e.g., for the above-mentioned backoff time. Further, if the result of the carrier sense operation is found to be that the second UL carrier F2 is occupied, the access node 100 may adapt the scheduling the radio device 10 for UL transmissions on the first UL carrier F1 in such a way that a transport format with higher performance is used. The higher performance transport format may for example have a higher data rate, e.g., above a data rate threshold, higher order modulation scheme, larger transport block size, and/or higher transmit power, e.g., above a transmit power threshold, than a transport format which is used when the result of the carrier sense operation is found to be that the second UL carrier F2 is unoccupied, which means that the radio device 10 might proceed to perform a UL transmission on the second UL carrier F2. Also in this case, the adaptation of the scheduling may continue for a certain time period, e.g., for the above-mentioned backoff time. Further, if the result of the carrier sense operation is found to be that the second UL carrier F2 is unoccupied, the access node 100 may also refrain from scheduling the radio device 10 for UL transmissions on the first UL carrier F1.

Further, the radio device 10 may control its carrier sense operations or LBT procedures depending on the scheduling of UL transmissions on the first UL carrier F1. For example, if in a certain time period the radio device 10 is scheduled for one or more UL transmissions on the first UL carrier F1, the radio device 10 may refrain from initiating a carrier sense operation or LBT procedure on the second UL carrier F2.

For enabling the above procedures, the radio device 10 may indicate the result of the carrier sense operation to the access node 100. The further access node 110 may assist the access node 110 by providing information on the availability of the second UL carrier F2 to the access node 110. The further access node 110 may derive this information from usage of the second UL carrier F2 by the radio device 10 or by one or more other radio devices.

Figure 3:
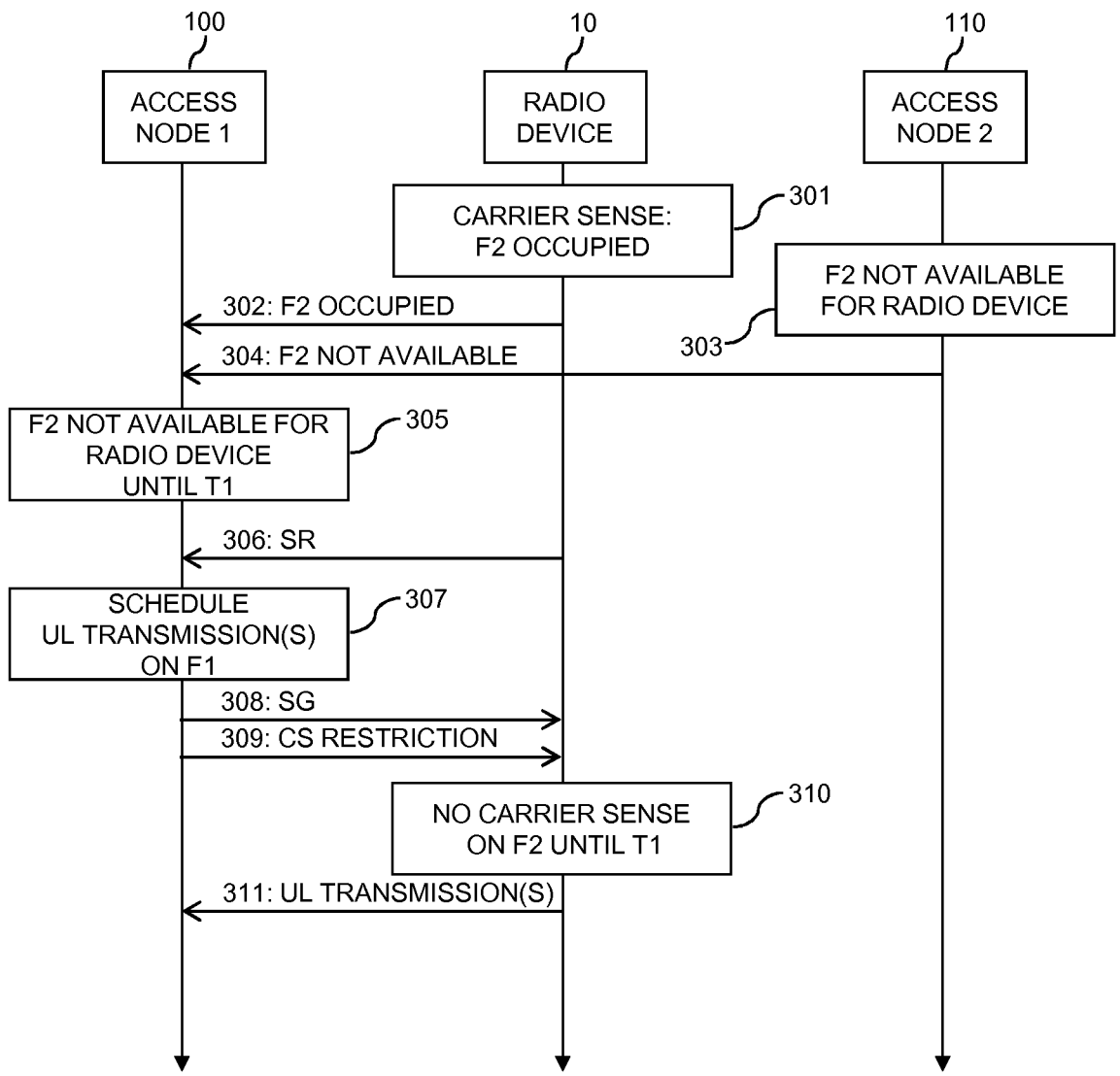
FIG. 3 schematically illustrates an example of processes according to an embodiment of the invention.

FIG. 3 shows an example of processes which are based on the concepts as outlined above. The processes of FIG. 3 are based on the scenario of FIG. 2 and involve the radio device 10, the access node 100 and the further access node 110.

In the example of FIG. 3, it is assumed that the radio device 10 intends to perform a UL transmission on the second UL carrier F2 and thus performs the carrier sense operation to assess whether the second UL carrier is unoccupied, as illustrated by block 301. In the illustrated example, it is assumed that the result of the carrier sense operation is that the second UL carrier is assessed as being occupied. At this point, the radio device 10 thus cannot perform the intended UL transmission on the second UL carrier F2. According to the configuration of the LBT procedure, at least until expiry of the backoff time the radio device 10 will not transmit on the second UL carrier F2.

As illustrated by message 302, the radio device 10 indicates this result of the carrier sense operation to the access node 100. The result of the carrier sense operation may be indicated on an UL control channel. Together with the result of the carrier sense operation, the radio device 10 may also indicate a time period in which the radio device 10 will not transmit on the second UL carrier. This time period may correspond to or depend on the backoff time used in the LBT procedure, e.g., by considering the backoff time expected to be applied by the radio device 10 or the backoff time actually used by the radio device 10 after the carrier sense operation of block 301.

As illustrated by block 303, also the further access node 110 may determine that the second UL carrier is currently not available for an UL transmission by the radio device 10. The further access node 110 may derive this information from usage of the second UL carrier F2 by one or more other radio devices. For example, the further access node 110 could be receiving a UL transmission by another radio device, which means that from the perspective of the radio device 10 the second UL carrier F2 would be occupied. The further access node 110 could also monitor the second UL carrier and, in response to detecting signal not originating from the radio device 10, determine that the second UL carrier is currently not available for an UL transmission by the radio device 10.

As illustrated by message 304, the further access node 110 may indicate the above information concerning availability of the second UL carrier F2 for an UL transmission by the radio device 10 to the access node 100. This may for example be accomplished via an interface configured between the access node 100 and the further access node 110, such as an X2 interface as specified in the LTE radio technology. In the illustrated example, the message 304 indicates that the second UL carrier is currently not available for an UL transmission by the radio device 10. Further, the message 304 may also indicate a time period in which the second UL carrier is not available for an UL transmission by the radio device 10. This time period may for example be based on an expected duration of an ongoing UL transmission on the second UL carrier F2.

Based on the message 302 and/or the message 304, the access node 100 then determines that until time T1 the second UL carrier F2 is not available for an UL transmission by the radio device 10, as illustrated by block 305. The access node 100 be estimate the time T1 from information provided in the message 302 and/or the message 304, e.g., the backoff time as indicated by the message 302 or the expected duration of an ongoing UL transmission as indicated by the message 304.

As further illustrated, the access node 100 may receive a scheduling request (SR) 306 from the radio device 10. With the SR 306, the radio device 10 may request allocation of radio resources of the first UL carrier F1, to be used by the radio device 10 for an UL transmission on the first UL carrier F1. It is noted that the timing of the SR 306 as illustrated in FIG. 3 is merely exemplary and that the SR 306 could also be transmitted at an earlier time, e.g., already before the carrier sense operation of block 301. Further, in some cases transmission of a SR might not be needed. For example, allocation of UL radio resources of the first UL carrier F1 to the radio device 10 could also be triggered by some other event, such as a buffer status report from the radio device 10.

As illustrated by block 307, the access node 100 then schedules the radio device 10 for one or more UL transmissions on the first UL carrier F1. This scheduling is performed taking into account the availability of the second UL carrier F2 as determined at step 305. In the illustrated example, this may involve that until T1 the access node 100 continues to schedule the radio device 10 for UL transmissions on the first UL carrier F1. This may also involve that until the time T1 the scheduling is performed in such a way that a first transport format is used for the UL transmission(s) on the first UL carrier F1, e.g., a transport format having a first data rate, e.g., above a data rate threshold, a first modulation scheme, a first transport block size, and/or first transmit power, e.g., above a transmit power threshold. In this way, the access node 100 may take into account that until T1 the radio device 10 will not transmit on the second UL carrier F2 and no problems due simultaneous UL transmissions on the first UL carrier F1 and the second UL carrier F2 are to be expected, even if the radio device 10 is subject to one of the above mentioned constraints.

By sending a scheduling grant (SG) 308 to the radio device 10, the access node 100 may indicate the radio resources of the first UL carrier F1 as allocated during the scheduling process of block 307 to the radio device 10. As illustrated by message 309, the access node 100 may also indicate restrictions for the carrier sense operations on the second UL carrier F2 to the radio device 10. For example, if the access node 100 has determined from the information provided by the further access node 110 that even after the backoff time applied by the radio device 10 the second UL carrier F2 will not be available for an UL transmission by the radio device 10, e.g., that the time T1 is later than expiry of the backoff time currently applied by the radio device 10, the access node 100 may indicate restrictions which cause the radio device 10 to refrain from repeating the carrier sense operation before the time T1, as indicated by block 310. This could for example be achieved by indicating the restrictions in terms of an extended backoff time.

As further illustrated, in accordance with the scheduling process of block 307, the radio device 10 may then perform one or more UL transmissions 311 on the first UL carrier F1. The UL transmission(s) 311 may include user plane data and/or control plane data.

It is noted that as an alternative to indicating the result of the carrier sense operation by message 302, the result of the carrier sense operation could also be indicated in an implicit manner. For example, a transmission on the first UL carrier could indicate that the result of the carrier sense operation is that the second UL carrier is assessed as being occupied, while a lack of a transmission on the first UL carrier could indicate that the result of the carrier sense operation is that the second UL carrier is assessed as being unoccupied. Further, the radio device could selectively apply different transport formats for a scheduled UL transmission on the first UL carrier to indicate the result of the carrier sense operation. For example, if the result of the carrier sense operation is that the second UL carrier is occupied, the radio device could apply the above-mentioned first transport format. If the result of the carrier sense operation is that the second UL carrier is unoccupied, the radio device could apply a second transport format, e.g., a transport format having a second data rate which is lower than the first data rate of the first transport format, a second modulation scheme of lower order and/or more robust type than the first modulation scheme of the first transport format, a second transport block size which is smaller than the first transport block size of the first transport format, and/or second transmit power which is lower than the first transmit power of the first transport format.

Figure 4:
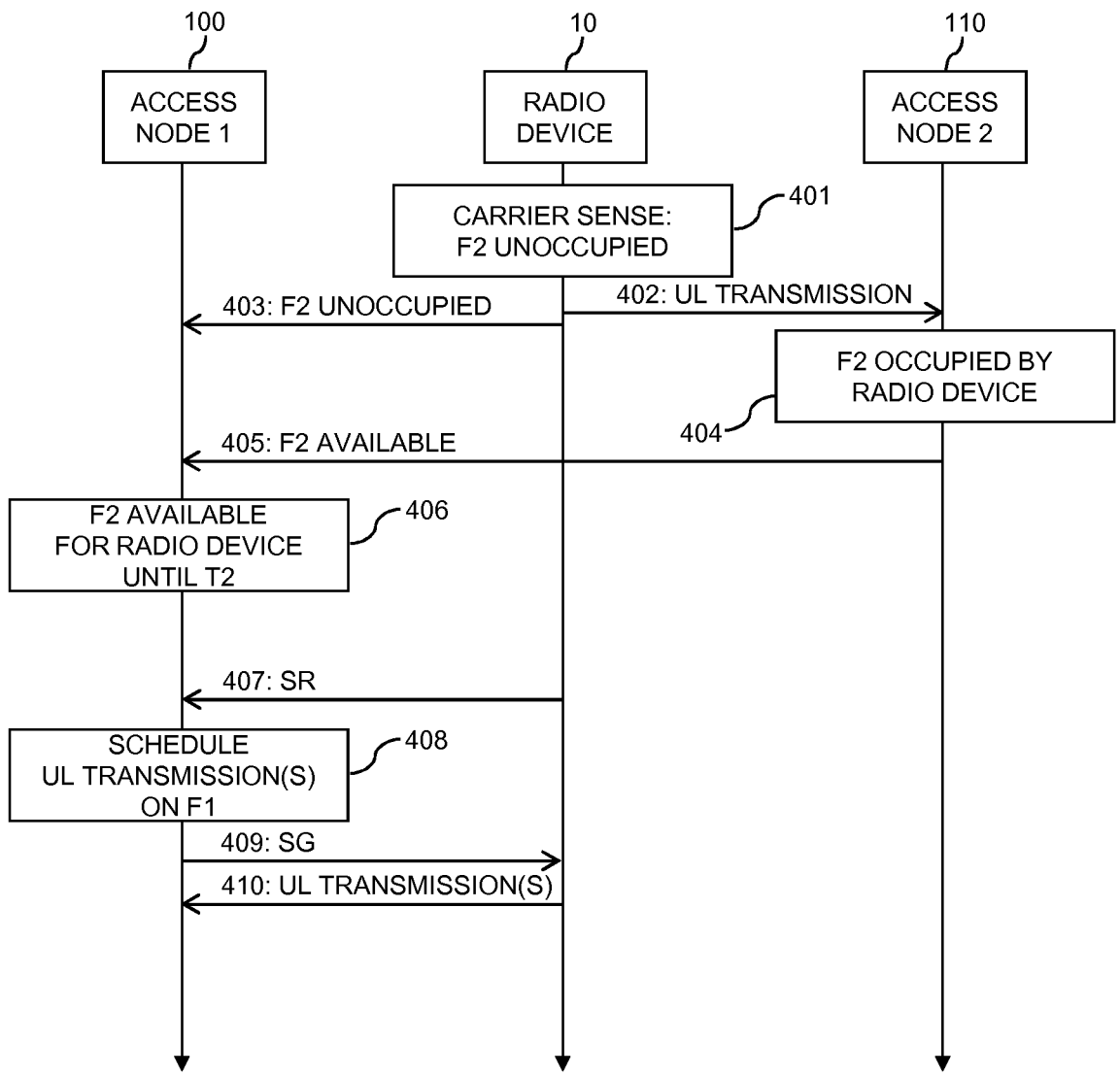
FIG. 4 schematically illustrates a further example of processes according to an embodiment of the invention.

FIG. 4 shows a further example of processes which are based on the concepts as outlined above. Also the processes of FIG. 4 are based on the scenario of FIG. 2 and involve the radio device 10, the access node 100 and the further access node 110.

In the example of FIG. 4, it is assumed that the radio device 10 intends to perform a UL transmission on the second UL carrier F2 and thus performs the carrier sense operation to assess whether the second UL carrier is unoccupied, as illustrated by block 401. In the illustrated example, it is assumed that the result of the carrier sense operation is that the second UL carrier is assessed as being unoccupied. Accordingly, the radio device 10 thus immediately proceeds to performs the intended UL transmission 402 on the second UL carrier F2. The UL transmission 402 may include user plane data and/or control plane data.

As illustrated by message 403, the radio device 10 also indicates this result of the carrier sense operation to the access node 100. The result of the carrier sense operation may be indicated on an UL control channel. Together with the result of the carrier sense operation, the radio device 10 may also indicate a time period for which the radio device 10 will transmit on the second UL carrier. The radio device 10 may for example estimate this time period from a size of the intended UL transmission.

As illustrated by block 404, also the further access node 110 may determine that the second UL carrier F2 now occupied by the radio device 10. In this situation, the radio device 10 has thus gained access to the second UL carrier F2 and the second UL carrier F2 may continue to be available for an UL transmission by the radio device 10. The further access node 110 may derive this information from usage of the second UL carrier F2 by the radio device 10 for the UL transmission 402.

As illustrated by message 405, the further access node 110 may indicate the above information concerning availability of the second UL carrier F2 for an UL transmission by the radio device 10 to the access node 100. This may for example be accomplished via an interface configured between the access node 100 and the further access node 110, such as an X2 interface as specified in the LTE radio technology. In the illustrated example, the message 405 indicates that the second UL carrier is currently available for an UL transmission by the radio device 10. Further, the message 405 may also indicate a time period in which the second UL carrier is available for an UL transmission by the radio device 10. This time period may for example be based on an expected duration of the UL transmission 402 or of subsequent UL transmissions by the radio device 10.

Based on the message 403 and/or the message 405, the access node 100 then determines that until time T2 the second UL carrier F2 is available for an UL transmission by the radio device 10, as illustrated by block 406. The access node 100 be estimate the time T2 from information provided in the message 403 and/or the message 405.

As further illustrated, the access node 100 may receive an SR 407 from the radio device 10. With the SR 407, the radio device 10 may request allocation of radio resources of the first UL carrier F1, to be used by the radio device 10 for an UL transmission on the first UL carrier F1. It is noted that the timing of the SR 407 as illustrated in FIG. 4 is merely exemplary and that the SR 406 could also be transmitted at an earlier time, e.g., already before the carrier sense operation of block 401. Further, in some cases transmission of a SR might not be needed. For example, allocation of UL radio resources of the first UL carrier F1 to the radio device 10 could also be triggered by some other event, such as a buffer status report from the radio device 10.

As illustrated by block 408, the access node 100 then schedules the radio device 10 for one or more UL transmissions on the first UL carrier F1. This scheduling is performed taking into account the availability of the second UL carrier F2 as determined at step 406. In the illustrated example, this may involve that until the time T2 the access node 100 the scheduling of the radio device 10 for UL transmissions on the first UL carrier F1 is performed in such a way that a second transport format is used for the UL transmission(s) on the first UL carrier F1, e.g., a transport format having a second data rate which is lower than the first data rate used when the second UL carrier is found to be occupied, a second modulation scheme of lower order and/or more robust type than the first modulation scheme used when the second UL carrier is found to be occupied, a second transport block size which is smaller than the first transport block size used when the second UL carrier is found to be occupied, and/or second transmit power which is lower than the first transmit power used when the second UL carrier is found to be occupied. In this way, the access node 100 may take into account that until T2 the radio device 10 is expected to transmit on the second UL carrier F2 and the above mentioned constraints need to be considered.

By sending an SG 409 to the radio device 10, the access node 100 may indicate the radio resources of the first UL carrier F1 as allocated during the scheduling process of block 408 to the radio device 10. As further illustrated, in accordance with the scheduling process of block 408, the radio device 10 may then perform one or more UL transmissions 410 on the first UL carrier F1. The UL transmission(s) 410 may include user plane data and/or control plane data.

It is noted that in the example of FIG. 4 the access node 100 could also refrain from scheduling the radio device 10 until T2. Accordingly, while transmitting on the second UL carrier F2, the radio device 10 would not be eligible for scheduling on of an UL transmission on the first UL carrier F1. This option may for example be used if the radio device 10 is be power limited and does not have sufficient power to simultaneously transmit on both UL carriers F1, F2, i.e., is subject to the constraint C1, or if the capabilities of the radio device 10 are limited in such a way that the radio device 10 cannot transmit simultaneously on both UL carriers F1, F2, i.e., subject to the constraint C2.

Figure 5:
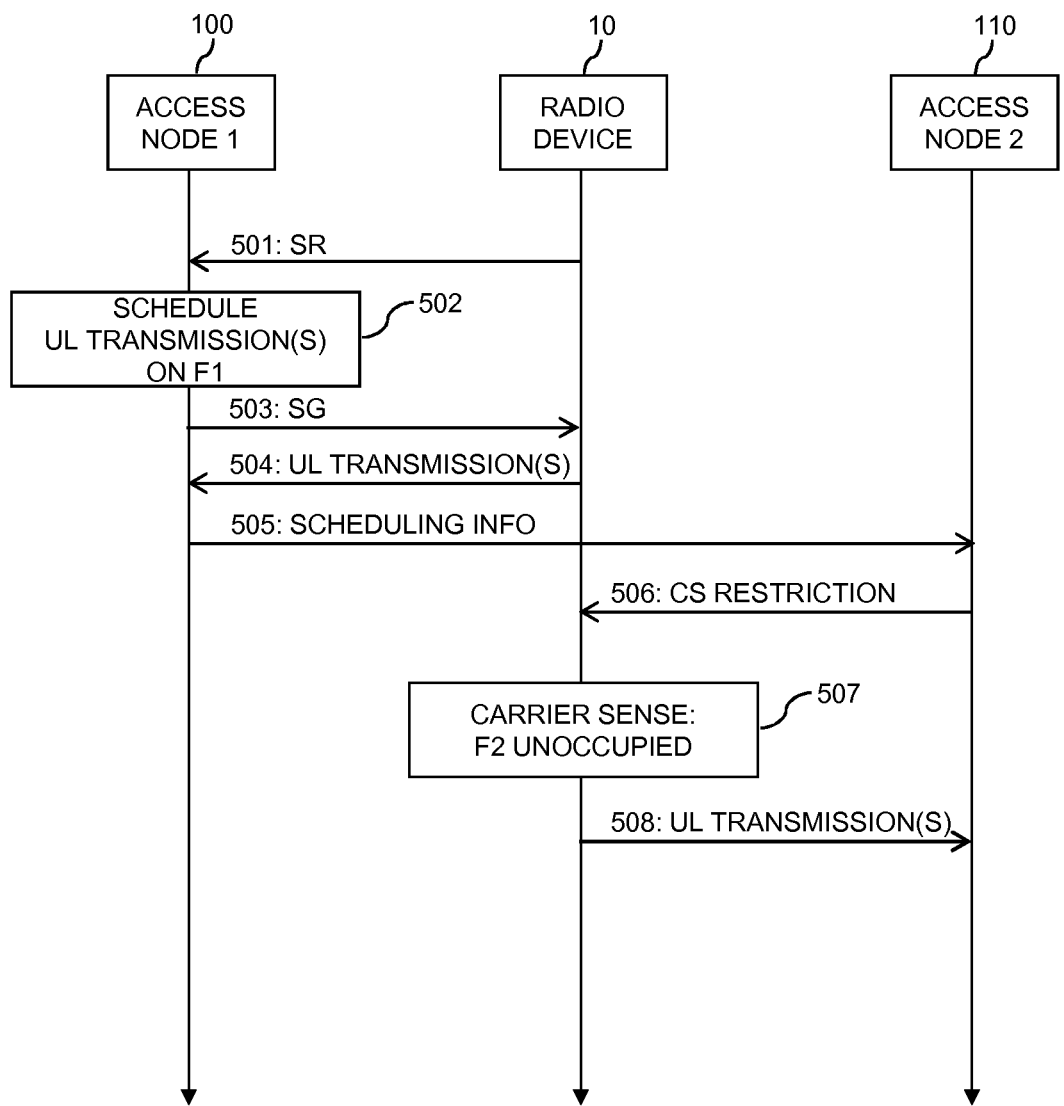
FIG. 5 schematically illustrates a further example of processes according to an embodiment of the invention.

In the examples of FIGS. 4 and 5, the first and second transport format can be pre-configured, be determined autonomously by the radio device 10, or be configured by the wireless communication network, e.g., by the access node 100. The second transport format is typically defined to be more conservative in terms of number of transmitted useful bits and modulation and coding scheme (MCS) than the first transport format, such that the first transport format typically will provide a lower data rate and/or use a higher transmit power than the second transport format. For example the first transport format may use 16-level QAM (Quadrature Amplitude Modulation) with a code rate of 1/2 while the second transport format may use QPSK (Quadrature Phase Shift Keying) with a code rate of 1/3.

FIG. 5 shows a further example of processes which are based on the concepts as outlined above. Also the processes of FIG. 5 are based on the scenario of FIG. 2 and involve the radio device 10, the access node 100 and the further access node 110.

In the example of FIG. 5, it is assumed that the radio device 10 intends to perform a UL transmission on the first UL carrier F1. Accordingly, the radio device 10 may send a SR 501 to the access node 100. With the SR 501, the radio device 10 may request allocation of radio resources of the first UL carrier F1, to be used by the radio device 10 for an UL transmission on the first UL carrier F1. It is noted that in some cases transmission of a SR might not be needed. For example, allocation of UL radio resources of the first UL carrier F1 to the radio device 10 could also be triggered by some other event, such as a buffer status report from the radio device 10.

As illustrated by block 502, the access node 100 then schedules the radio device 10 for one or more UL transmissions on the first UL carrier F1. By sending an SG 503 to the radio device 10, the access node 100 may indicate the radio resources of the first UL carrier F1 as allocated during the scheduling process of block 502 to the radio device 10. As further illustrated, in accordance with the scheduling process of block 502, the radio device 10 may then perform one or more UL transmissions 504 on the first UL carrier F1. The UL transmission(s) 504 may include user plane data and/or control plane data.

As illustrated by message 505, the access node 100 then sends information concerning the scheduling process of block 502 to the further access node 110. For example, this information may indicate when the radio device 10 is scheduled for a UL transmission on the first UL carrier. Further, this information may also indicate the transport format to be used for the scheduled UL transmission(s) on the first UL carrier, e.g., the data rate, modulation scheme, transport block size, and/or transmit power to be used for the scheduled UL transmission(s).

Based on the received information, the further access node 110 may determine one or more restrictions for the carrier sense operations on the second UL carrier F2 and indicate these restrictions to the radio device 10, as indicated by message 506. For example, if the further access node 110 has determined from the information provided by the access node 100 that for a certain time period the radio device is scheduled for one or more UL transmissions on the first UL carrier F1, and these UL transmissions would be subject to one of the above-mentioned constraints, the further access node 110 may determine the restrictions in such a way that the radio device 10 will refrain from performing the carrier sense operation in this time interval. The restrictions may also be indicated in terms of a backoff time to be applied by the radio device 10 when the second UL carrier is assessed as being occupied, in terms of criteria for deciding whether to perform the carrier sense operation, or in terms of preferred times to perform the carrier sense operation.

In the example of FIG. 5, it is assumed that taking into account the restrictions indicated in message 506, the radio device 10 then performs the carrier sense operation to assess whether the second UL carrier F2 is unoccupied, as illustrated by block 507. In the illustrated example, it is assumed that the result of the carrier sense operation is that the second UL carrier F2 is assessed as being unoccupied. Accordingly, the radio device 10 thus immediately proceeds to performs a UL transmission 508 on the second UL carrier F2. The UL transmission 508 may include user plane data and/or control plane data.

It is noted that in the example of FIG. 5 the access node 100 could determine the restriction(s) for the carrier sense operation and indicate the restriction(s) to the radio device 10, either indirectly via the further access node 110 or directly, e.g., via the above-mentioned DL CCH.

Further, the restriction(s) for the carrier sense operation could also be determined by the radio device itself, based on the information provided in the SG 503. Accordingly, the radio device 10 may take into account the scheduling processes for the first UL carrier F1 when controlling the carrier sense operations on the second UL carrier F2. For example, when the radio device 10 received an SG for the first UL carrier F1 or when the radio device 10 has transmitted an SR for the first UL carrier F1, then during a configurable time window the radio device 10 may refrain from initiating the carrier sense operation on the second UL carrier. As a result, while transmitting on the first UL carrier F1 as scheduled, the radio device 10 would refrain from performing the carrier sense operation to attempt to transmit on the second UL carrier F2. While transmitting on the first UL carrier F1 as scheduled, the radio device 10 may also selectively decide whether to perform the carrier sense operation on the first UL carrier, e.g., depending on available resources of the radio device 10, such as available transmit power, available processing resources, available memory, or the like. For example, the radio device 10 may consider is budget for transmit power after performing the UL transmission scheduled on the first UL carrier F1, the transmit power required to perform a UL transmission on the second UL carrier F2.

Further, the radio device 10 may consider the data rate required or expected for the UL transmission scheduled on the first UL carrier F1, and the data rate required or expected for a UL transmission on the second UL carrier F2 and perform the carrier sense operation if these data rates are compatible with the above-mentioned constraint C3. Further, the radio device 10 may refrain from initiating the carrier sense operation on the second UL carrier F2 if one or more of the following conditions are met: the budget for transmit power after performing the UL transmission scheduled on the first UL carrier F1 is below a first power threshold, the transmit power required to perform a UL transmission on the second UL carrier F2 is above a second power threshold, the data rate required or expected for the UL transmission scheduled on the first UL carrier F1 is above a first data threshold (d1), the data rate required or expected for a UL transmission on the second UL carrier F2 is above a second data threshold. In this way the radio device 10 can be enabled to avoid performing the carrier sense operation on the second UL carrier when there are insufficient resources for actually performing an UL transmission on the second UL carrier F2.

Figure 6:
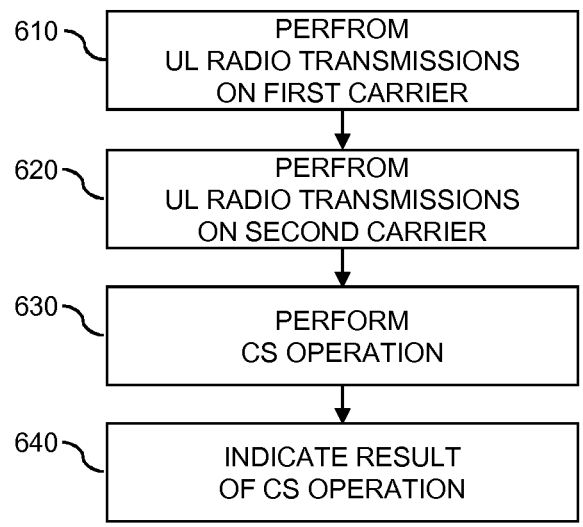
FIG. 6 shows a flowchart for schematically illustrating a method according to an embodiment of the invention.

FIG. 6 shows a flowchart for illustrating a method of controlling radio transmissions in a wireless communication network. The method of FIG. 6 may be utilized for implementing the illustrated concepts in a radio device, such as the above-mentioned radio device 10. If a processor-based implementation of the radio device is used, the steps of the method may be performed by one or more processors of the radio device. In such a case the radio device may further comprise a memory in which program code for implementing the below described functionalities is stored.

At step 610, the radio device performs UL transmissions on a first carrier, e.g., the above mentioned first UL carrier F1. The UL transmissions on the first carrier require scheduling by a node of the wireless communication network, such as by the above-mentioned access node 100.

At step 620, the radio device performs UL transmissions on a second carrier, e.g., the above mentioned second UL carrier F2. The UL transmissions on the second carrier require that, by a carrier sense operation, the radio device assesses the second carrier as being unoccupied before proceeding to the UL transmission on the second carrier.

At step 630, the radio device performs the carrier sense operation to assess whether the second carrier is unoccupied. This may occur in response to the radio device having UL data to transmit and thus intending to perform a UL transmission on the second carrier.

At step 640, the radio device provides an indication of a result of the carrier sense operation to the node. The radio device may provide the indication by sending a message or signal to the node, such as the above-mentioned message 302. In some scenarios, the radio device may also provide the indication of the result of the carrier sense operation by controlling transmission on the first carrier. For example, the radio device may provide the indication of the result of the carrier sense operation by transmitting on the first carrier if the result of the carrier sense operation is that the second carrier is assessed as being unoccupied, and not transmitting on the first carrier if the result of the carrier sense operation is that the second carrier is assessed as being occupied.

Further, the radio device may indicate the result of the carrier sense operation by using different transport formats. Specifically, the radio device may provide the indication of the result of the carrier sense operation by transmitting on the first carrier on the basis of a first transport format if the result of the carrier sense operation is that the second carrier is assessed as being occupied, and transmitting on the first carrier on the basis of a second transport format if the result of the carrier sense operation is that the second carrier is assessed as being unoccupied. The first transport format may be based on a higher transmit power than the second transport format. Further, the first transport format may be based on a higher order modulation than the second transport format. Further, the first transport format may be based on a higher coding rate than the second transport format. Further, the first transport format may be based on a higher data rate than the second transport format. Further, the first transport format may be based on a larger transport block size than the second transport format. Further, the first transport format may be based on a higher number of transport blocks than the second transport format. At least one of the first and second transport format may be preconfigured in the radio device, e.g., based on requirements of a standard. Further, the radio device may receive control information indicating at least one of the first transport format and the second transport format, e.g., from the node which is responsible for the scheduling of the UL transmissions on the first carrier.

In some scenarios, the indication of the result of the carrier sense operation may also be supplemented with further information. For example, if in the carrier sense operation the first carrier is assessed as being occupied, the radio device may further provide, to the node responsible for the scheduling of the UL transmissions on the first carrier, an indication of a time period in which the radio device will not transmit on the second carrier, e.g., an indication of a backoff time applied by the radio device. Further, if in the carrier sense operation the first carrier is assessed as being unoccupied, the radio device may further provide, to the node responsible for the scheduling of the UL transmissions on the first carrier, an indication when the radio device will transmit on the second carrier, e.g., by indicating an expected duration of the UL transmission on the second carrier.

In some scenarios, the radio device may perform the carrier sense operation when no UL transmission is scheduled on the first carrier.

In some scenarios, the radio device may provide the indication of the result of the carrier sense operation in response to determining that the radio device is subject to a constraint concerning concurrent transmission on the first carrier and the second carrier, such as one of the above-mentioned constraints C1, C2, C3.

Figure 7:
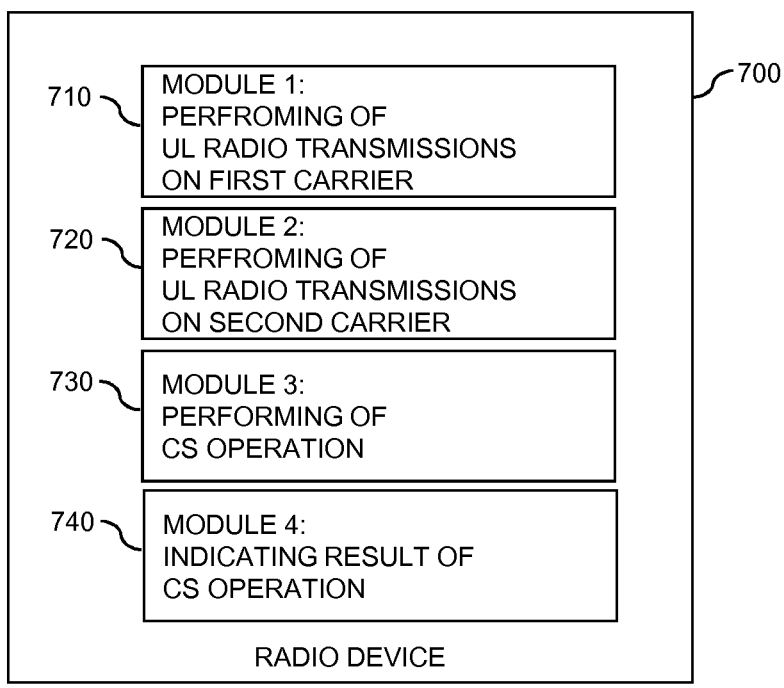
FIG. 7 shows a block diagram for illustrating functionalities of a radio device according to an embodiment of the invention.

FIG. 7 shows a block diagram for illustrating functionalities of a radio device 700 which operates according to the method of FIG. 6. As illustrated, the radio device 700 may be provided with a module 710 configured to perform UL transmissions requiring scheduling on a first carrier, such as explained in connection with step 710. Further, the radio device 700 may be provided with a module 720 configured to perform, on a second carrier, UL transmissions requiring a carrier sense operation to assess whether the second carrier is unoccupied, such as explained in connection with step 720. Further, the radio device 700 may be provided with a module 730 configured to perform the carrier sense operation, such as explained in connection with step 630. Further, the radio device 700 may be provided with a module 740 configured to indicate the result of the carrier sense operation to the node responsible for the scheduling, such as explained in connection with step 740.

It is noted that the radio device 700 may include further modules for implementing other functionalities, such as known functionalities of a UE or similar user end device. Further, it is noted that the modules of the radio device 700 do not necessarily represent a hardware structure of the radio device 700, but may also correspond to functional elements, e.g., implemented by hardware, software, or a combination thereof.

Figure 8:
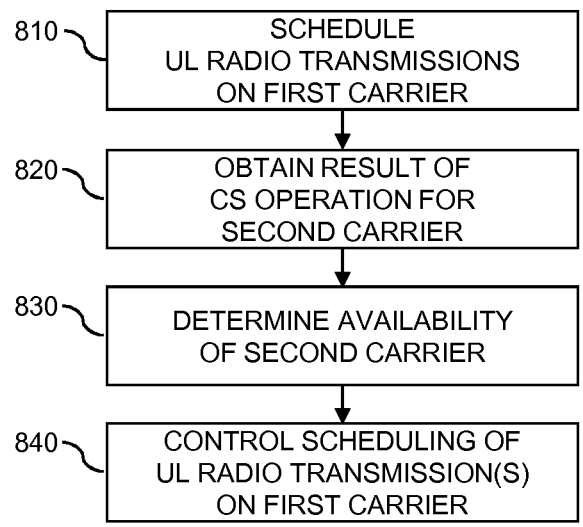
FIG. 8 shows a flowchart for schematically illustrating a further method according to an embodiment of the invention.

FIG. 8 shows a flowchart for illustrating a method of controlling radio transmissions in a wireless communication network. The method of FIG. 8 may be utilized for implementing the illustrated concepts in a node of the wireless communication network, such as the above-mentioned access node 100. If a processor-based implementation of the node is used, the steps of the method may be performed by one or more processors of the node. In such a case the node may further comprise a memory in which program code for implementing the below described functionalities is stored.

At step 810, the node schedules UL transmissions of a radio device on a first carrier, e.g., the above-mentioned first UL carrier F1. The radio device may for example correspond to the above-mentioned radio device 10.

At optional step 820, the node may obtain an indication of a result of a carrier sense operation performed by the radio device to assess whether a second carrier is unoccupied. The second carrier may for example correspond to the above-mentioned second UL carrier F2.

The node may obtain the indication of the result of the carrier sense operation on the basis of transmission activity of the radio device on the first carrier.

For example, if a transmission of the radio device on the first carrier is detected, the node may determine that the result of the carrier sense operation is that the second carrier is assessed as being unoccupied. If no transmission of the radio device on the first carrier is detected, the node may determine that the result of the carrier sense operation is that the second carrier is assessed as being occupied.

According to a further example usage of different transport formats may indicate the result of the carrier sense operation: If a transmission of the radio device on the first carrier is based on a first transport format, the node may determine that the result of the carrier sense operation is that the second carrier is assessed as being occupied. If a transmission of the radio device on the first carrier is based on a second transport format, the node may determine that the result of the carrier sense operation is that the second carrier is assessed as being unoccupied.

The first transport format may be based on a higher transmit power than the second transport format. Further, the first transport format may be based on a higher order modulation than the second transport format. Further, the first transport format may be based on a higher coding rate than the second transport format. Further, the first transport format may be based on a higher data rate than the second transport format. Further, the first transport format may be based on a larger transport block size than the second transport format. Further, the first transport format may be based on a higher number of transport blocks than the second transport format. At least one of the first and second transport format may be preconfigured in the radio device, e.g., based on requirements of a standard. Further, the node may send control information indicating at least one of the first transport format and the second transport format to the radio device.

In some scenarios, the indication of the result of the carrier sense operation may also be supplemented with further information. For example, if the result of the carrier sense operation is that the first carrier is assessed as being occupied, the node may further obtain, from the radio device, an indication of a time period in which the radio device will not transmit on the second carrier. For example, the node may obtain an indication of a backoff time applied by the radio device. Further, if the result of the carrier sense operation is that the first carrier is assessed as being occupied, the node may further obtain, from the radio device, an indication when the radio device will transmit on the second carrier.

At step 830, the node determines availability of the second carrier for UL transmissions of the radio device on the second carrier, The UL transmissions on the second carrier require that, by a carrier sense operation, the radio device assesses the second carrier as being unoccupied before proceeding to the UL transmission on the second carrier.

In some scenarios, the node may determine the availability depending on the indication of the result of the carrier sense operation as optionally received at step 820. In some scenarios, the node may also receive signals on the second carrier and determine the availability of the second carrier on the basis of the signals received on the second carrier. In some scenarios, a further node of the wireless communication network may be configured for receiving the UL transmissions of the radio device on the second carrier. An example of such further node is the above-mentioned further access node. In this case, the node may also determine the availability of the second carrier on the basis information from the further node.

At step 840, the node controls controlling the scheduling of one or more of the uplink transmissions on the first carrier depending on the determined availability of the second carrier as determined at step 830. This may involve refraining from scheduling UL transmissions on the first carrier when the second carrier is found to be available for a UL transmission by the radio device. Further, this may involve adapting the scheduling in such a way that a certain transport format is used for the UL transmissions on the first carrier, e.g., a transport format which is compatible with one or more constraints to which the radio device is subject with respect to concurrent UL transmissions on the first carrier and the second carrier.

Further, the node may control the scheduling of one or more of the UL transmissions on the first carrier depending on the indication of the time period in which the radio device will not transmit on the second carrier, as optionally received at step 820. Further, the node may control the scheduling of one or more of the UL transmissions on the first carrier depending on the indication when the radio device will transmit on the second carrier, as optionally received at step 820.

In some scenarios, the UL transmissions on the second carrier may require scheduling as well (in addition to the carrier sense operation). In this case, the node may control when the radio device performs the carrier sense operation by controlling scheduling of the UL transmissions on the second carrier.

Figure 9:
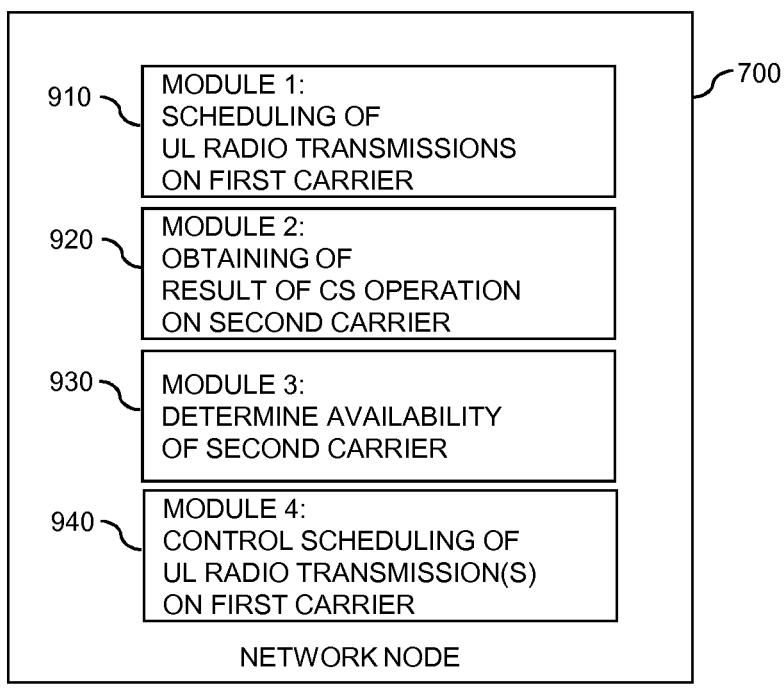
FIG. 9 shows a block diagram for illustrating functionalities of a network node according to an embodiment of the invention.

FIG. 9 shows a block diagram for illustrating functionalities of a wireless communication network node 900 which operates according to the method of FIG. 8. As illustrated, the node 900 may be provided with a module 910 configured to schedule UL transmissions by a radio device on a first carrier, such as explained in connection with step 810. Further, the node 900 may optionally be provided with a module 920 configured to obtain an indication of a result of a carrier sense operation from the radio device, such as explained in connection with step 820. Further, the node 900 may be provided with a module 930 configured to determine availability of the second carrier for a UL transmission on the second carrier, such as explained in connection with step 830. Further, the node 900 may be provided with a module 940 configured to control the scheduling of the UL transmissions on the first carrier depending on the determined availability, such as explained in connection with step 840.

It is noted that the node 900 may include further modules for implementing other functionalities, such as known functionalities of a base station or similar access node. Further, it is noted that the modules of the node 900 do not necessarily represent a hardware structure of the node 900, but may also correspond to functional elements, e.g., implemented by hardware, software, or a combination thereof.

The methods of FIGS. 6 and 8 may also be combined in a system which includes a radio device and a node of a wireless communication network. In such system, the node may be configured to schedule UL transmissions of the radio device on a first carrier and determine availability of a second carrier for UL radio transmissions of the radio device on the second carrier. the UL transmissions on the second carrier require that, by a carrier sense operation, the radio device assesses the second carrier as being unoccupied before proceeding to the UL transmission on the second carrier. Further, the node may be configured to control the scheduling of one or more of the UL transmissions on the first carrier depending on the determined availability of the second carrier. The radio device may be configured to perform the UL transmissions on the first carrier in accordance with the scheduling by the node and perform the carrier sense operation to assess whether the second carrier is unoccupied. The radio device may also be configured to provide an indication of the result of the carrier sense operation to the node.

Figure 10:
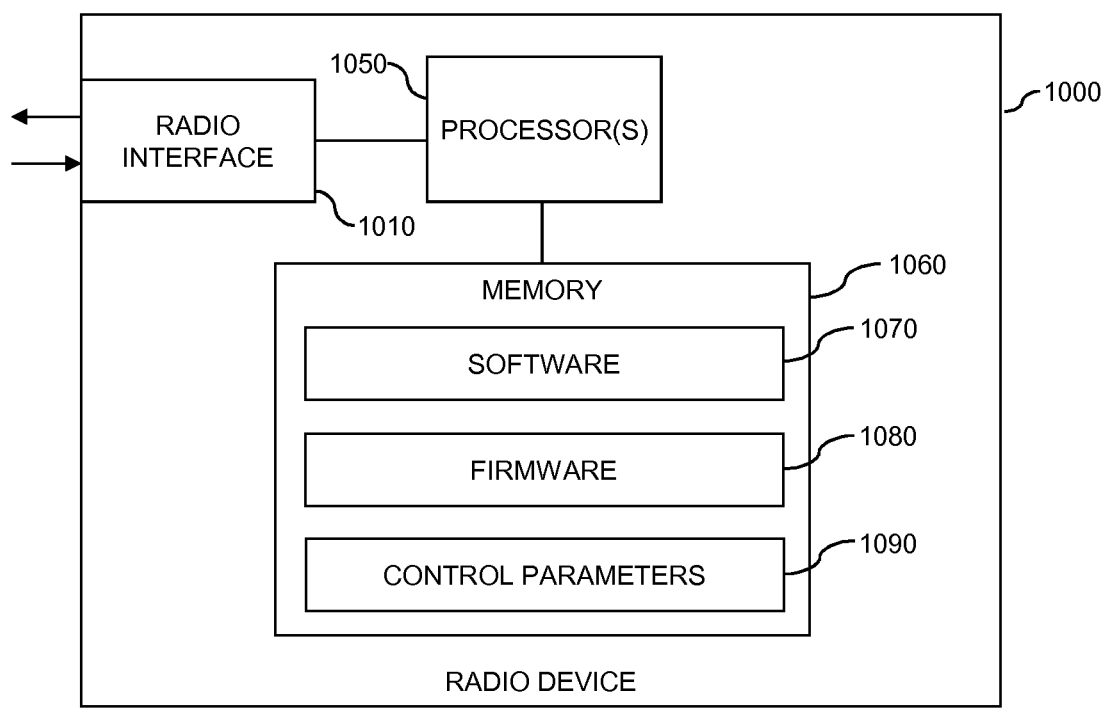
FIG. 10 schematically illustrates structures of a radio device according to an embodiment of the invention.

FIG. 10 illustrates a processor-based implementation of a radio device 1000 which may be used for implementing the above described concepts. For example, the structures as illustrated in FIG. 10 may be used for implementing the above-mentioned radio device 10.

As illustrated, the radio device 1000 may include a radio interface 1010 for performing radio transmissions, in particular UL transmissions to a wireless communication network. The radio interface 1010 may also be used for receiving and/or sending various information, such as for sending indications of a result of a carrier sense operation or for receiving scheduling grants.

Further, the radio device 1000 may include one or more processors 1050 coupled to the radio interface 1010 and a memory 1060 coupled to the processor(s) 1050. By way of example, the radio interface 1010, the processor(s) 1050, and the memory 1060 could be coupled by one or more internal bus systems of the radio device 1000. The memory 1060 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1060 may include software 1070, firmware 1080, and/or control parameters 1090. The memory 1960 may include suitably configured program code to be executed by the processor(s) 1050 so as to implement the above-described functionalities of a radio device, such as explained in connection with FIG. 6 or 7.

It is to be understood that the structures as illustrated in FIG. 10 are merely schematic and that the radio device 1000 may actually include further components which, for the sake of clarity, have not been illustrated, e.g., further interfaces or processors. Also, it is to be understood that the memory 1060 may include further program code for implementing known functionalities of a radio device, e.g., known functionalities of a UE or similar user end device. According to some embodiments, also a computer program may be provided for implementing functionalities of the radio device 1000, e.g., in the form of a physical medium storing the program code and/or other data to be stored in the memory 1060 or by making the program code available for download or by streaming.

Figure 11:
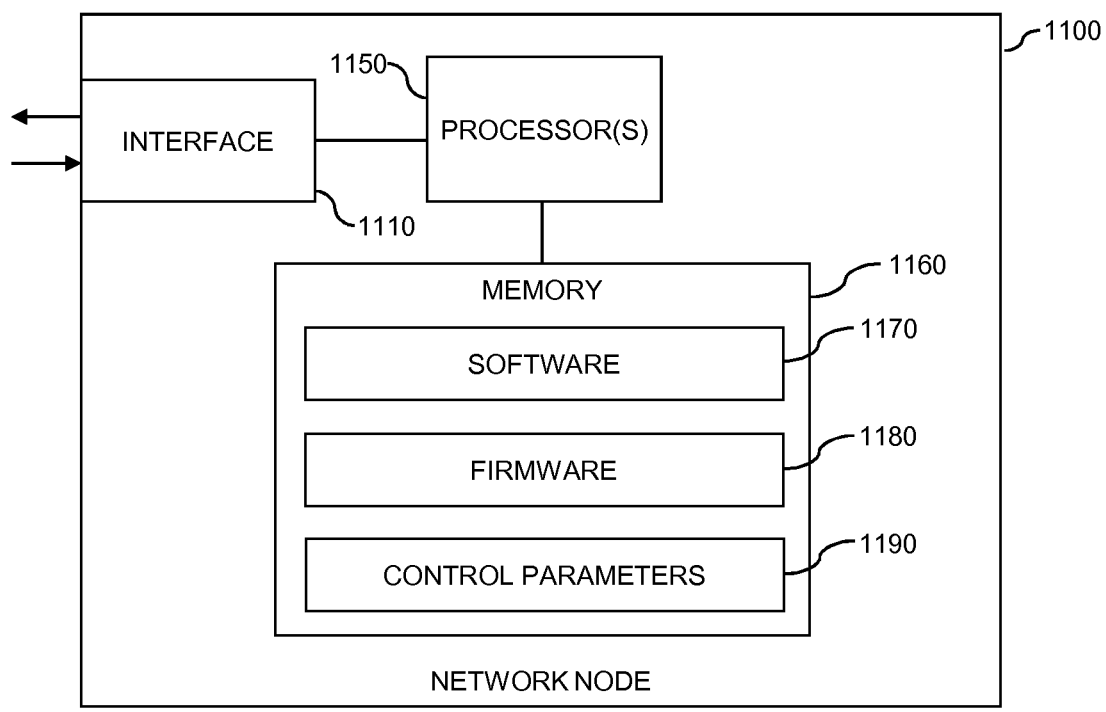
FIG. 11 schematically illustrates structures of a control node according to an embodiment of the invention.

FIG. 11 illustrates a processor-based implementation of a wireless communication network node 1100 which may be used for implementing the above described concepts. For example, the structures as illustrated in FIG. 11 may be used for implementing the above-mentioned access node 100.

As illustrated, the node 1100 may include an interface 1110 with respect to one or more radio devices, such as the above-mentioned radio device 10. The interface may be a radio interface and be used for receiving UL transmissions from the radio device(s). The interface 1110 may also be used for receiving and/or sending various information, such as for receiving indications of a result of a carrier sense operation or for sending scheduling grants.

Further, the node 1100 may include one or more processors 1150 coupled to the interface 1110 and a memory 1160 coupled to the processor(s) 1150. By way of example, the control interface 1110, the processor(s) 1150, and the memory 1160 could be coupled by one or more internal bus systems of the node 1100. The memory 2060 may include a ROM, e.g., a flash ROM, a RAM, e.g., a DRAM or SRAM, a mass storage, e.g., a hard disk or solid state disk, or the like. As illustrated, the memory 1160 may include software 1170, firmware 1180, and/or control parameters 1190. The memory 1160 may include suitably configured program code to be executed by the processor(s) 1150 so as to implement the above-described functionalities of a wireless communication network node, such as explained in connection with FIG. 8 or 9.

It is to be understood that the structures as illustrated in FIG. 11 are merely schematic and that the node 1100 may actually include further components which, for the sake of clarity, have not been illustrated, e.g., further interfaces or processors. Also, it is to be understood that the memory 1160 may include further program code for implementing known functionalities of a wireless communication network node, e.g., known functionalities of a base station or similar access node. According to some embodiments, also a computer program may be provided for implementing functionalities of the node 1100, e.g., in the form of a physical medium storing the program code and/or other data to be stored in the memory 1160 or by making the program code available for download or by streaming.

As can be seen, the concepts as described above may be used for efficiently coordination scheduled transmissions on one carrier with contention-based transmissions on another carrier. As a result, resource utilization may be improved. Further, delays associated with failed UL transmission attempts may be avoided.

It is to be understood that the examples and embodiments as explained above are merely illustrative and susceptible to various modifications. For example, the illustrated concepts may be applied in connection with various kinds of wireless communication technologies, without limitation to the above-mentioned examples of LTE, LTE LAA, or WLAN. Further, the illustrated concepts may be applied in various kinds of radio devices, including mobile phones, portable computing devices, machine type communication devices, base stations, and relay stations. Moreover, it is to be understood that the above concepts may be implemented by using correspondingly designed software to be executed by one or more processors of an existing device, or by using dedicated device hardware. Further, it should be noted that the illustrated nodes or devices may each be implemented as a single device or as a system of multiple interacting devices.

The invention claimed is:

1. A method of controlling uplink transmissions from a radio device to a wireless communication network, the method comprising:
    performing, by the radio device, first uplink transmissions on a first carrier, the first uplink transmissions on the first carrier requiring scheduling by a node of the wireless communication network;
    performing, by the radio device, second uplink transmissions on a second carrier, the second uplink transmissions on the second carrier requiring that, by a carrier sense operation, the radio device assesses the second carrier as being unoccupied before proceeding to the second uplink transmissions on the second carrier;
    performing, by the radio device, the carrier sense operation to assess whether the second carrier is unoccupied; and
    providing, by the radio device, an indication of a result of the carrier sense operation to the node by controlling third uplink transmissions on the first carrier, wherein controlling the third uplink transmissions on the first carrier is based on whether the second carrier is assessed as being occupied or unoccupied.

2. The method of claim 1, wherein providing, by the radio device, the indication of the result of the carrier sense operation by controlling the third uplink transmissions on the first carrier comprises:
    transmitting on the first carrier when the result of the carrier sense operation is that the second carrier is assessed as being unoccupied; and
    not transmitting on the first carrier when the result of the carrier sense operation is that the second carrier is assessed as being occupied.

3. The method of claim 1, wherein providing, by the radio device, the indication of the result of the carrier sense operation by controlling the third uplink transmissions on the first carrier comprises:
    transmitting on the first carrier based on a first transport format when the result of the carrier sense operation is that the second carrier is assessed as being occupied; and
    transmitting on the first carrier based on a second transport format when the result of the carrier sense operation is that the second carrier is assessed as being unoccupied.

4. The method of claim 1, wherein providing, by the radio device, the indication of the result of the carrier sense operation is performed in response to determining that the radio device is subject to a constraint concerning a concurrent transmission on the first carrier and the second carrier.

5. A method of controlling uplink transmissions from a radio device to a node of a wireless communication network, the method comprising:
    scheduling, by the node, uplink transmissions of the radio device on a first carrier;
    determining, by the node, availability of a second carrier for uplink transmissions of the radio device on the second carrier, wherein the uplink transmissions on the second carrier require that, by a carrier sense operation, the radio device assesses the second carrier as being unoccupied before proceeding to the uplink transmissions on the second carrier; and
    controlling, by the node, the scheduling of one or more of the uplink transmissions on the first carrier depending on the determined availability of the second carrier wherein the availability of the second carrier is determined based on whether transmission activity of the radio device on the first carrier is detected.

6. The method of claim 5, further comprising:
    obtaining, by the node, an indication of a result of the carrier sense operation performed by the radio device to assess whether the second carrier is unoccupied.

7. The method of claim 6, wherein obtaining, by the node, the indication of the result of the carrier sense operation is based on the transmission activity of the radio device on the first carrier.

8. The method of claim 7, further comprising:
    determining by the node, when a transmission of the radio device on the first carrier is detected, that the result of the carrier sense operation is that the second carrier is assessed as being unoccupied; and
    determining by the node, when no transmission of the radio device on the first carrier is detected, that the result of the carrier sense operation is that the second carrier is assessed as being occupied.

9. The method of claim 5, further comprising controlling, by the node, when the radio device performs the carrier sense operation by controlling scheduling of the uplink transmissions on the second carrier.

10. A radio device, comprising:
processing circuitry; and
memory containing instructions executable by the processing circuitry whereby the radio device is operative to:
perform first uplink transmissions on a first carrier, the first uplink transmissions on the first carrier requiring scheduling by a node of a wireless communication network;
perform second uplink transmissions on a second carrier, wherein the second uplink transmissions on the second carrier require that the radio device assesses, by a carrier sense operation, the second carrier as being unoccupied before proceeding to the second uplink transmissions on the second carrier;
perform the carrier sense operation to assess whether the second carrier is unoccupied; and
provide an indication of a result of the carrier sense operation to the node by controlling third uplink transmissions on the first carrier, wherein controlling the third uplink transmissions on the first carrier is based on whether the second carrier is assessed as being occupied or unoccupied.

11. The radio device of claim 10, wherein the instructions are such that the radio device, to provide the indication of the result of the carrier sense operation by controlling the third uplink transmissions on the first carrier, is operative to:
transmit on the first carrier when the result of the carrier sense operation is that the second carrier is assessed as being unoccupied; and
not transmit on the first carrier when the result of the carrier sense operation is that the second carrier is assessed as being occupied.

12. The radio device of claim 10, wherein the instructions are such that the radio device, to provide the indication of the result of the carrier sense operation by controlling the third uplink transmissions on the first carrier, is operative to:
transmit on the first carrier based on a first transport format when the result of the carrier sense operation is that the second carrier is assessed as being occupied; and
transmit on the first carrier based on a second transport format when the result of the carrier sense operation is that the second carrier is assessed as being unoccupied.

13. The radio device of claim 10, wherein the instructions are such that the radio device is operative to provide the indication of the result of the carrier sense operation in response to a determination that the radio device is subject to a constraint concerning a concurrent transmission on the first carrier and the second carrier.

14. A node for a wireless communication network, the node comprising:
processing circuitry; and
memory containing instructions executable by the processing circuitry whereby the node is operative to:
schedule uplink transmissions of a radio device on a first carrier;
determine availability of a second carrier for uplink transmissions of the radio device on the second carrier, wherein the uplink transmissions on the second carrier require that the radio device assesses, by a carrier sense operation, the second carrier as being unoccupied before proceeding to the uplink transmissions on the second carrier; and
control, depending on the determined availability of the second carrier, the scheduling of one or more of the uplink transmissions on the first carrier wherein the availability of the second carrier is determined based on whether transmission activity of the radio device on the first carrier is detected.

15. The node of claim 14, wherein the instructions are such that the node is further operative to:
obtain an indication of a result of the carrier sense operation performed by the radio device to assess whether the second carrier is unoccupied.

16. The node of claim 15, wherein the instructions are such that the node is operative to obtain the indication of the result of the carrier sense operation based on the transmission activity of the radio device on the first carrier.

17. The node of claim 16, wherein the instructions are such that the node is further operative to:
determine, when a transmission of the radio device on the first carrier is detected, that the result of the carrier sense operation is that the second carrier is assessed as being unoccupied; and
determine, when no transmission of the radio device on the first carrier is detected, that the result of the carrier sense operation is that the second carrier is assessed as being occupied.

18. The node of claim 14, wherein the instructions are such that the node is further operative to control when the radio device performs the carrier sense operation by controlling scheduling of the uplink transmissions on the second carrier.

* * * * *